United States Patent
Longoria

(10) Patent No.: US 6,318,225 B1
(45) Date of Patent: Nov. 20, 2001

(54) TORTILLA CUTTER

(75) Inventor: Jose L. Longoria, Plainview, TX (US)

(73) Assignee: ITE, Inc., Plainview, TX (US)

( * ) Notice: Subject to any disclaimer, the term of this patent is extended or adjusted under 35 U.S.C. 154(b) by 0 days.

(21) Appl. No.: 09/589,057

(22) Filed: Jun. 7, 2000

Related U.S. Application Data

(60) Provisional application No. 60/139,068, filed on Jun. 11, 1999.

(51) Int. Cl.[7] ................................. B26D 7/02; A23P 1/00
(52) U.S. Cl. ................................. 83/454; 30/114; 53/514; 83/91; 83/167; 83/648; 83/697; 83/932
(58) Field of Search ................................. 53/514; 83/167, 83/932, 86, 89, 91, 762, 454, 648, 697; 30/114, 303, 273

(56) References Cited

U.S. PATENT DOCUMENTS

| | | | |
|---|---|---|---|
| 1,885,600 | * 11/1932 | Hjelte | 83/89 |
| 2,329,918 | * 9/1943 | Leavens | 83/697 X |
| 2,507,667 | * 5/1950 | Haller | 83/762 |
| 3,027,639 | * 4/1962 | Lovell | 30/114 |
| 3,077,215 | * 2/1963 | Kentor | 83/697 X |
| 3,211,200 | * 10/1965 | Belk | 83/697 |
| 3,788,030 | * 1/1974 | Moline | 53/123 |
| 4,873,759 | * 10/1989 | Burch | 83/454 X |
| 4,978,548 | 12/1990 | Cope et al. | 426/439 |
| 5,018,419 | * 5/1991 | Omura | 30/303 X |
| 5,148,655 | 9/1992 | Salinas | 53/514 |
| 5,662,949 | 9/1997 | Rubio et al. | 425/310 |
| 5,918,533 | 7/1999 | Lawrence et al. | 99/339 |
| 5,918,538 | * 7/1999 | Rodriguez et al. | 83/932 X |
| 6,196,100 | * 3/2001 | David et al. | 83/167 X |

* cited by examiner

Primary Examiner—Rinaldi I. Rada
Assistant Examiner—Charles Goodman
(74) Attorney, Agent, or Firm—Daniel V. Thompson

(57) ABSTRACT

An automatic tortilla cutter (10) able to cut stacked tortillas utilizing an openable housing (12) having a left housing (12L) and a right housing (12R) pivotally mounted on a housing bracket (12F) therebetween. The cutter (14) is positioned over the housing (12). Both the openable housing (12) and cutter (14) are preferably powered by a piston.

3 Claims, 6 Drawing Sheets

TORTILLA CUTTER

This application claims benefit of Prov. No. 60/139,068 filed Jun. 11, 1999.

TECHNICAL FIELD

The present invention relates to tortilla cutters. More particularly, the present invention relates to an automatic cutter that is able to cut stacked tortillas.

BACKGROUND ART

Numerous innovations for tortilla cutters have been provided in the prior art that are described as follows. Even though these innovations may be suitable for the specific individual purposes to which they address, they differ from the present invention as hereinafter contrasted.

In U.S. Pat. No. 5,148,655, titled Slicer and Bagger for Substantially Flat Food Products, invented by Salinas, stacks of food products are manually placed on top of a slicing blade and a slotted ram vertically positioned above the stack pushes the stack through the blade into a bag below the blade. The drawback of this device is its complexity and the inability to automate the cutting operation.

In U.S. Pat. No. 5,918,533, titled Tortilla Manufacturing Apparatus, invented by Lawrence et al., a system for making tortillas includes a sheeter, a roller/heater, and an oven. Tortillas are die cut into an oblong shape in the sheeter. The roller/heater rolls the tortillas into a round shape and conductively heats the tortillas simultaneously on the top and bottom surfaces, gelatinizing the food product and sealing in moisture. The tortillas are then baked in an oven. Slot marks on the tortillas are avoided as the roller/heater has upper and lower belts have continuous surfaces.

In U.S. Pat. No 4,978,548, titled Method and Apparatus for Continuous Production of Tortilla Chips, invented by Lawrence et al., the method includes steps of mixing tortilla flour and water to form a dough, rolling the dough into a continuous sheet, cutting tortilla shapes from the sheet, moving the tortilla shapes continuously through a baking oven to produce baked products, moving the baked products continuously along an equilibration conveyor to substantially equalize the moisture content of each baked product throughout the product to form an equilibrated product, moving the equilibrated product continuously through a refrigeration unit to cool the product to form a cooled product, cutting the cooled products into chip shapes, and moving the chip shapes to a fryer to produce the tortilla chips. The frying step may be continuous or batch as desired.

In U.S. Pat. No 5,662,949, titled Tortilla Manufacturing Apparatus, invented by Rubio et al., embodiments of this invention useful for removing articles cut from a sheet of flexible material include a gas transmissive conveyor belt that is brought into proximity to the exposed surface of the articles, a suction roll which backs the conveyor belt and has an internal vacuum and passageways for exposing said vacuum to the outer surface of the suction roll in configurations corresponding the leading portions of the articles, and means for causing the passageways to register substantially with the leading regions of the articles. Embodiments may also include passageways which are arcuately arrayed in groups, a cylindrical cutter roll for cutting out the articles from the sheet as it is being transported by a carrier surface, and/or a carrier surface in the form of a roll face.

Numerous innovations for a tortilla cutter have been provided in the prior art that are adapted to be used. Even though these innovations may be suitable for the specific individual purposes to which they address, they would not be suitable for the purposes of the present invention as heretofore described.

SUMMARY OF THE INVENTION

The present invention relates to tortilla cutters. More particularly, the present invention relates to an automatic cutter that is able to cut stacked tortillas.

The types of problems encountered in the prior art are individually cut tortillas are hard to stack and cost more to produce.

The present invention went contrary to the teaching of the art which describes and claims individually cut tortillas.

The present invention solved a long felt need to stack cut tortillas.

Accordingly, it is an object of the present invention to provide a tortilla cutter having a housing, and cutter which are both automatically controlled.

More particularly, it is an object of the present invention to provide the housing with a left housing, housing shaft with a left housing shaft opening, housing bracket, and right housing.

In keeping with these objects, and with others which will become apparent hereinafter, one feature of the present invention resides, briefly stated, in the left housing having a left housing wall with a left housing wall slot, a left housing top rib with a left housing top rib opening and a left housing top rib notch, a left housing middle rib with a left housing middle rib opening and a left housing middle rib notch, a left housing bottom rib with a left housing bottom rib opening and a left housing bottom rib notch, a left housing connector with a left housing connector first opening and a left housing connector second opening.

When the housing bracket is designed in accordance with the present invention, it has a housing bracket top having a housing bracket top left opening and a housing bracket top right opening, a housing bracket middle, a housing bracket bottom with a housing bracket bottom left opening (not shown) and a housing bracket bottom right opening (not shown).

In accordance with another feature of the present invention, the right housing having a right housing wall with a right housing wall slot, a right housing top rib with a right housing top rib opening and a right housing top rib notch, a right housing middle rib with a right housing middle rib opening and a right housing middle rib notch, a right housing bottom rib with a right housing bottom rib opening and a right housing bottom rib notch, a right housing connector with a right housing connector first opening and a right housing connector second opening.

Another feature of the present invention is that the cutter has a cutter first blade and a cutter second blade, a cutter shaft, a cutter plate, a cutter plate first opening, and a cutter plate second opening.

The novel features which are considered characteristic for the invention are set forth in the appended claims. The invention itself, however, both as to its construction and its method of operation, together with additional objects and advantages thereof, will be best understood from the following description of the specific embodiments when read and understood in connection with the accompanying drawings.

LIST OF REFERENCE NUMERALS UTILIZED IN THE DRAWINGS

10—tortilla cutter (10)
12—housing (12)

12L—left housing (12L)
12LA—left housing wall (12LA)
12LAA—left housing wall slot (12LAA)
12LTB—left housing top rib (12LTB)
2LTBA—left housing top rib opening (12LTBA)
12LTBB—left housing top rib notch (12LTBB)
12LMB—left housing middle rib (12LMB)
12LMBA—left housing middle rib opening (12LMBA)
12LMBB—left housing middle rib notch (12LMBB)
12LBB—left housing bottom rib (12LBB)
12LBBA—left housing bottom rib opening (12LBBA)
12LBBB—left housing bottom rib notch (12LBBB)
12LD—left housing connector (12LD)
12LDA—left housing connector first opening (12LDA)
12LDB—left housing connector second opening (12LDB)
12E—housing shaft (12E)
12EA—left housing shaft opening (12LEA)
12F—housing bracket (12F)
12FT—housing bracket top (12FT)
12FTL—housing bracket top left opening (12FTL)
12FTR—housing bracket top right opening (12FTR)
12FM—housing bracket middle (12FM)
12FB—housing bracket bottom (12FB)
12FBL—housing bracket bottom left opening (not shown)
12FBR—housing bracket bottom eight opening (not shown)
12R—right housing (12R)
12RA—right housing wall (12RA)
12RAA—right housing wall slot (12RAA)
12RTB—right housing top rib (12RTB)
12RTBA—right housing top rib opening (12RTBA)
12RTBB—right housing top rib notch (12RTBB)
12RMB—right housing middle rib (12RMB)
12RMBA—right housing middle rib opening (12RMBA)
12RMBB—right housing middle rib notch (12RMBB)
12RBB—right housing bottom rib (not shown)
12RBBA—right housing bottom rib opening (not shown)
12RBBB—right housing bottom rib notch (12RBBB)
12RD—right housing connector (12RD)
12RDA—right housing connector first opening (12RDA)
12RDB—right housing connector second opening (12RDB)
14—cutter (14)
14A—cutter first blade (14A)
14B—cutter second blade (14B)
14C—cutter shaft (14C)
14D—cutter plate (14D)
14DA—cutter plate first opening (14DA)
14DB—cutter plate second opening (14DB)
14E—cutter plate shaft (14E)
15—base plate (15)
15A—base plate opening (15A)
16—tortilla stack (16)
16A—severed tortillas (16A)
18—container (18)

DESCRIPTION OF THE PREFERRED EMBODIMENT

Figure 1:
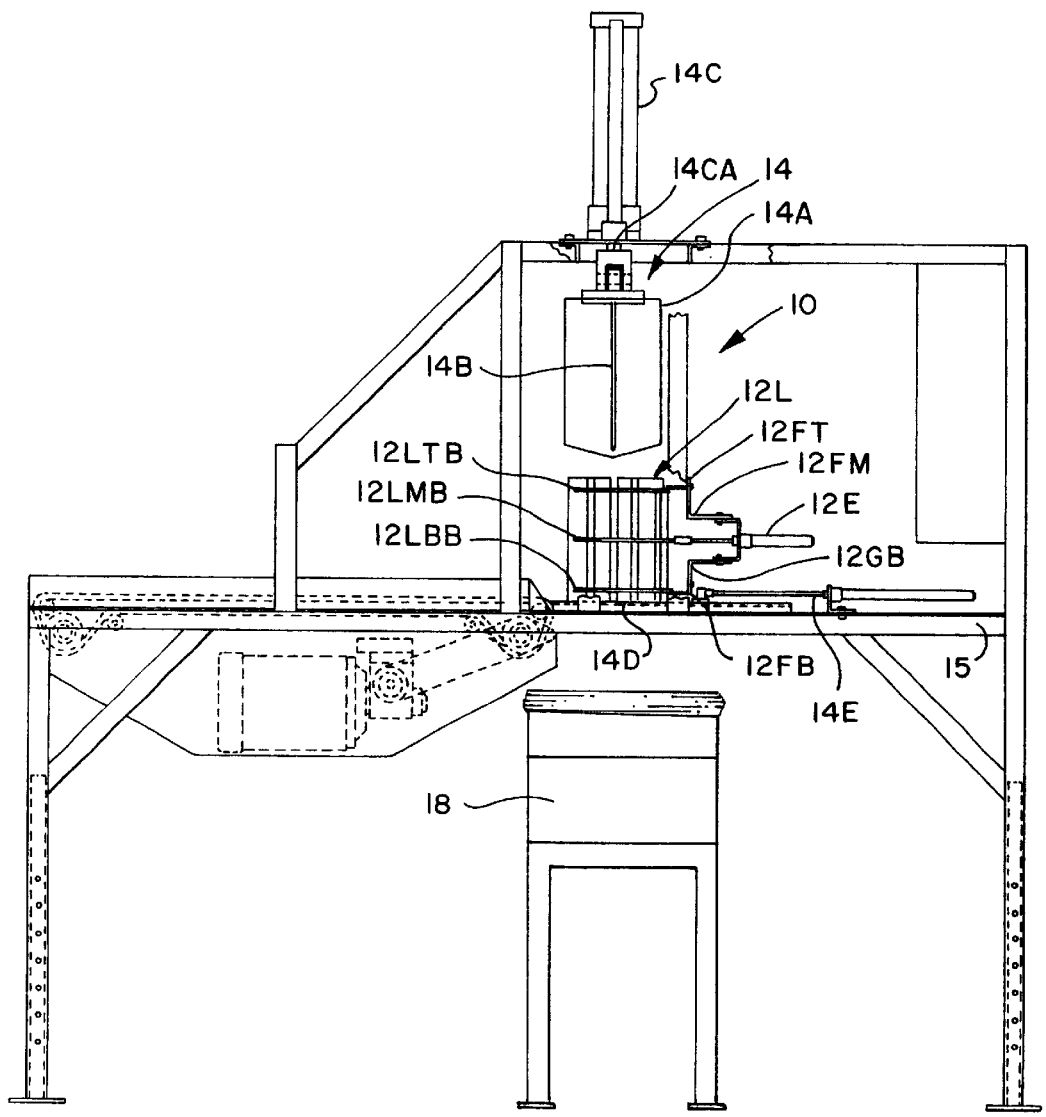
FIG. 1 is a left side view of a tortilla cutter (10).
Figure 2:
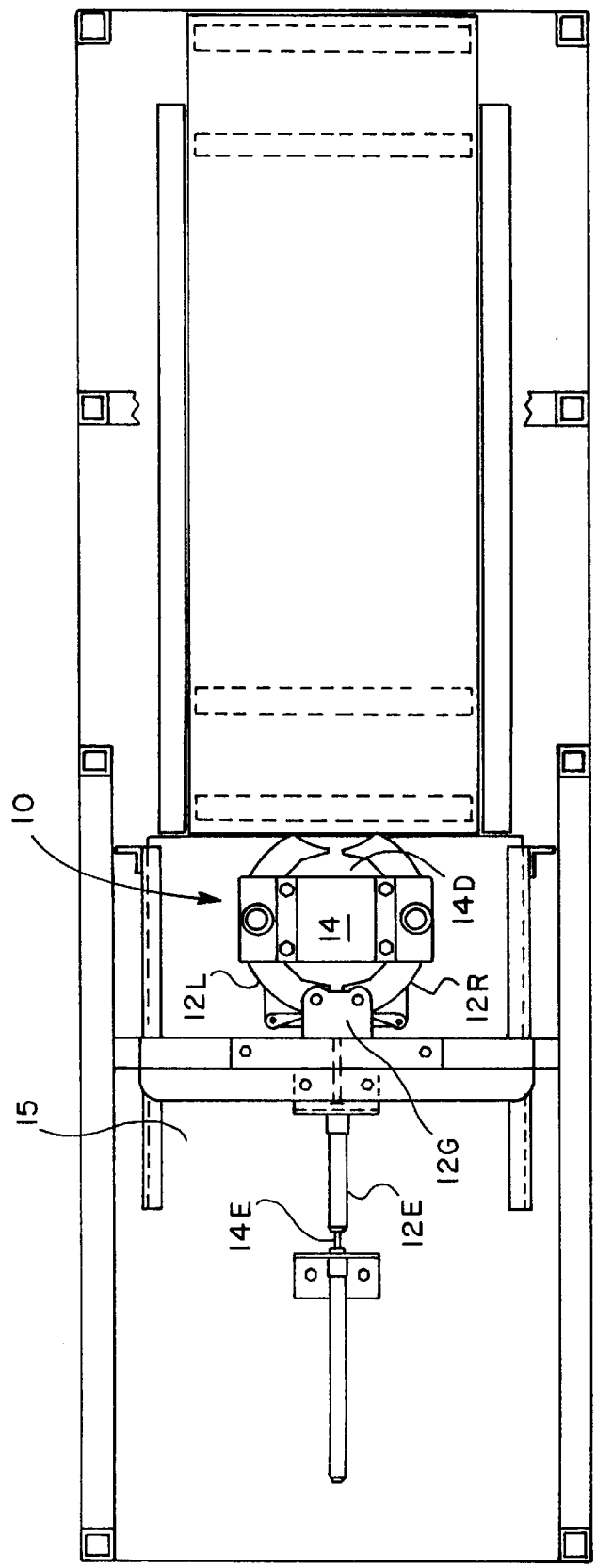
FIG. 2 is a top view of a tortilla cutter (10).

Firstly, referring to FIG. 1 and FIG. 2, tortilla cutter (10) includes a housing (12) which comprises a left housing (12L) having a left housing wall (12LA) with a middle positioned vertical left housing wall slot (12LAA) therein. The housing (12) further comprises a left housing middle rib (12LMB) securely affixed to the left housing wall (12LA). The left housing middle rib (12LMB) further comprises a left housing middle rib opening (12LMBA) therethrough and a left housing top rib notch (not shown) positioned in the middle thereof. The housing (12) further comprises a left housing connector (12LD) having a left housing connector first opening (12LDA) and a left housing connector second opening (12LDB) therethrough. The left housing middle rib (12LMB) is pivotally connected to the left housing connector (12LD) by a pin positioned through the left housing middle rib opening (12LMBA) and the left housing connector second opening (12LDB).

The housing (12) further comprises a right housing (12R) having a right housing wall (12RA) with a middle positioned vertical right housing wall slot (12RAA) therein. The housing (12) further comprises a right housing middle rib (12RMB) having a right housing middle rib opening (12RMBA) therethrough. The housing (12) further comprises a right housing connector (12RD) having a right housing connector first opening (12RDA) and a right housing connector second opening (12RDB) therethrough and a right housing top rib notch (not shown) positioned in a middle thereof. The right housing middle rib (12RMB) is pivotally connected to the right housing connector (12RD) by a pin positioned through the right housing middle rib opening (12RMBA) and the right housing connector second opening (12RDB).

The housing (12) further comprises a housing shaft (12E) having a left housing shaft opening (12LEA) therethrough. The left housing connector (12LD) and the right housing connector (12RD) are pivotally connected to the housing shaft (12E) by a pin positioned through the left housing middle rib opening (12LMBA) and the right housing middle rib opening (12RMBA) and the left housing shaft opening (12LEA). The housing (12) further comprises a left housing top rib (12LTB) securely affixed to the left housing wall (12LA). The left housing top rib (12LTB) comprises a left housing top rib opening (12LTBA) therethrough and a left housing top rib notch (12LTBB) therein.

Figure 3:
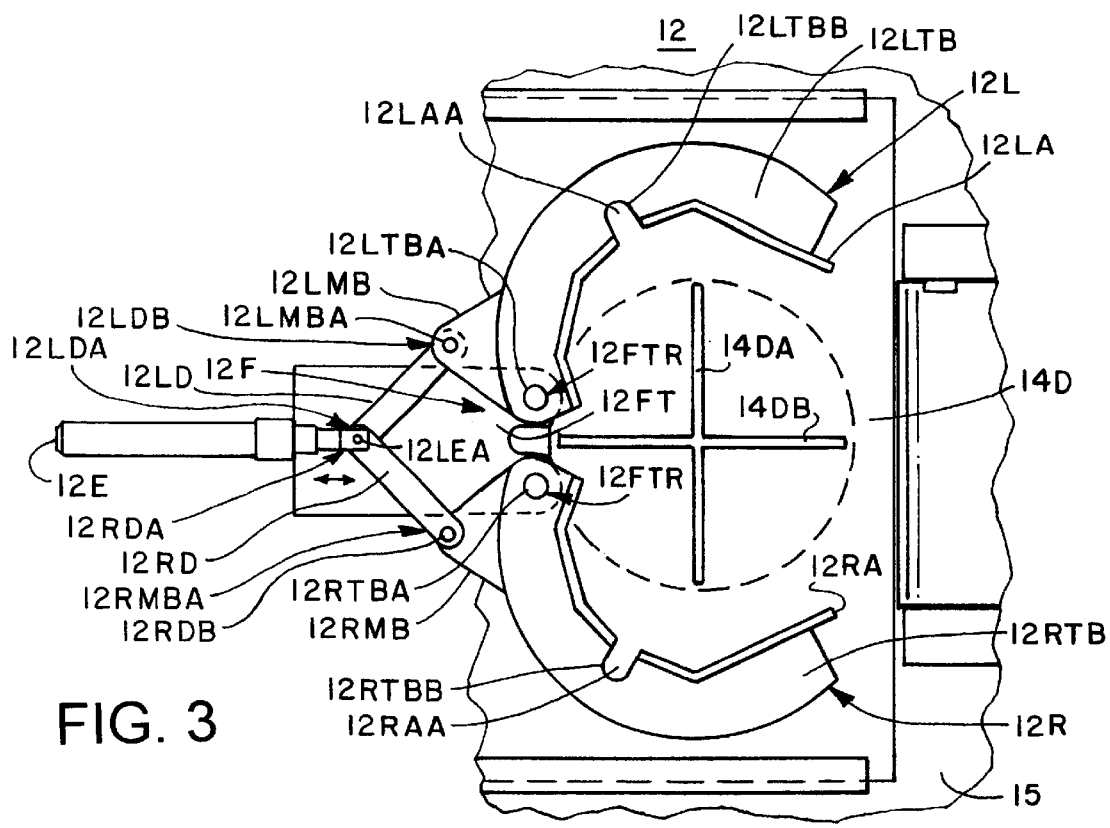
FIG. 3 is a top view of a housing (12) in an open position.
Figure 4:
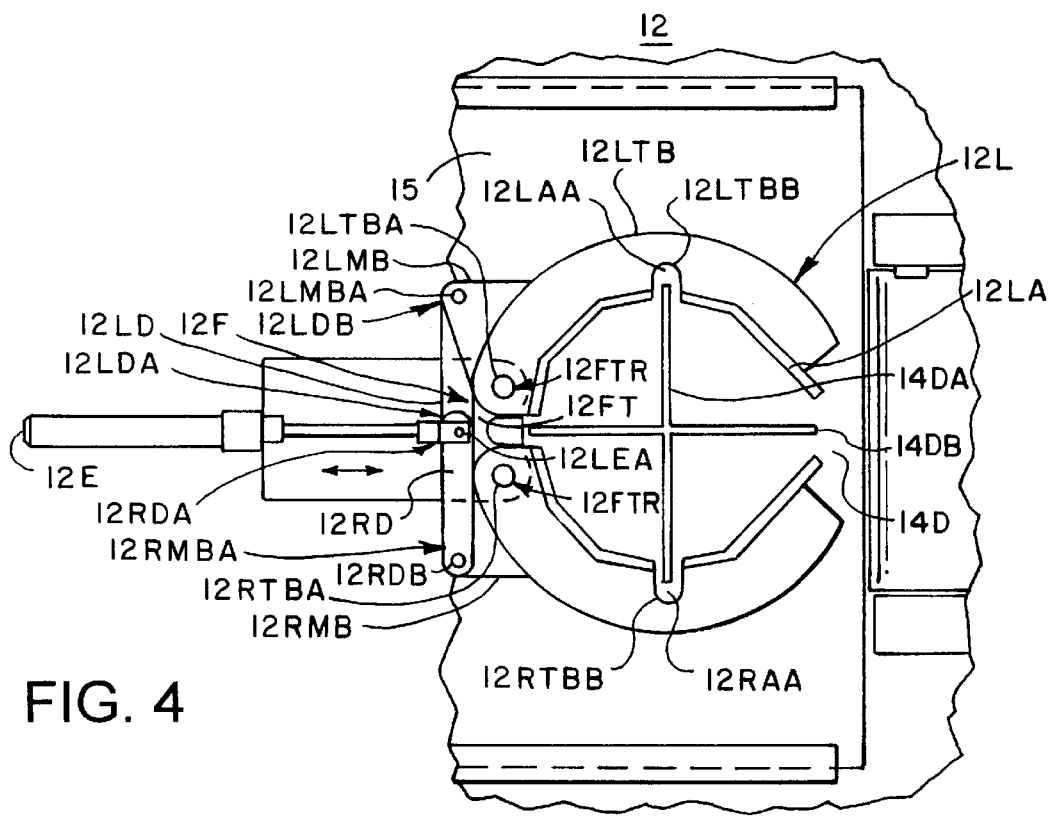
FIG. 4 is a top view of a housing (12) in a closed position.

The housing (12) further comprises a housing bracket (12F) having a housing bracket top (12FT) connected to a housing bracket bottom (12FB) by a housing bracket middle (12FM) (Refer to FIGS. 1, 2 and 3). The housing bracket top (12FT) comprises a housing bracket top left opening (12FTL) and a housing bracket top right opening (12FTR). The housing bracket bottom (12FB) comprises a housing bracket bottom left opening (12FBL) and a housing bracket bottom right opening (12FBR). The left housing top rib (12LTB) is pivotally attached to the housing bracket top (12FT) by a pin positioned through the housing bracket top left opening (12FTL) and the left housing top rib opening (12LTBA). The right housing top rib (12RTB) is pivotally attached to the housing bracket top (12FT) by a pin positioned through the housing bracket top right opening (12FTR) and the right housing top rib opening (12RTBA). The housing (12) further comprises a left housing bottom rib (12LBB) securely affixed to the left housing wall (12LA), the left housing bottom rib (12LBB) comprises a left housing bottom rib opening (12LBBA) therethrough and a left housing bottom rib notch (12LBBB) therein. The left housing bottom rib (12LBB) is pivotally attached to the housing bracket bottom (12FB) by a pin positioned through the housing bracket bottom left opening (not shown) and the left housing bottom rib opening (not shown). The right housing bottom rib (not shown) is pivotally attached to the housing bracket bottom (12FB) by a pin positioned through the housing bracket bottom right opening (not shown) and the right housing bottom rib opening (not shown). The housing shaft (12E) moves inward and outward powered by a device selected from a group consisting of motor, magnetic solenoid, hydraulic piston, and pneumatic piston (preferable).

A cutter (14) is positioned over the housing (12). The cutter (14) comprises a sharp cutter blade securely affixed to a cutter shaft (14C) powered by a device selected from a group consisting of motor, magnetic solenoid, hydraulic piston, and pneumatic piston (preferable). The cutter (14) further comprises a cutter plate (14D) positioned under the housing (12) and securely affixed to a cutter plate shaft (14E) powered by a device selected from a group consisting of motor, magnetic solenoid, hydraulic piston, and pneumatic piston (preferable). The cutter plate (14D) is manufactured from a material selected from a group consisting of plastic, plastic composite, rubber, rubber composite, fiberglass, epoxy, carbon-graphite, metal and metal alloy. Preferably, the cutter plate (14D) is manufactured from a plastic or plastic composite. The cutter plate (14D) is movable by the cutter plate shaft (14E) to selectively cover or expose, as the case may be, a base plate opening (15A) in a base plate (15) of the device. A container (18) is positioned below base plate opening (15A).

The cutter (14) preferably further comprises a cutter first blade (14A) and a cutter second blade (14B) positioned at perpendicular angles to each other and the cutter plate (14D) further comprises a cutter plate first opening (14DA) and a cutter plate second opening (14DB) in a complimentary position to the cutter first blade (14A) and the cutter second blade (14B), respectively.

The tortilla cutter (10) is manufactured from a material selected from a group consisting of metal and metal alloy but preferably manufactured from stainless steel.

Figure 5A:
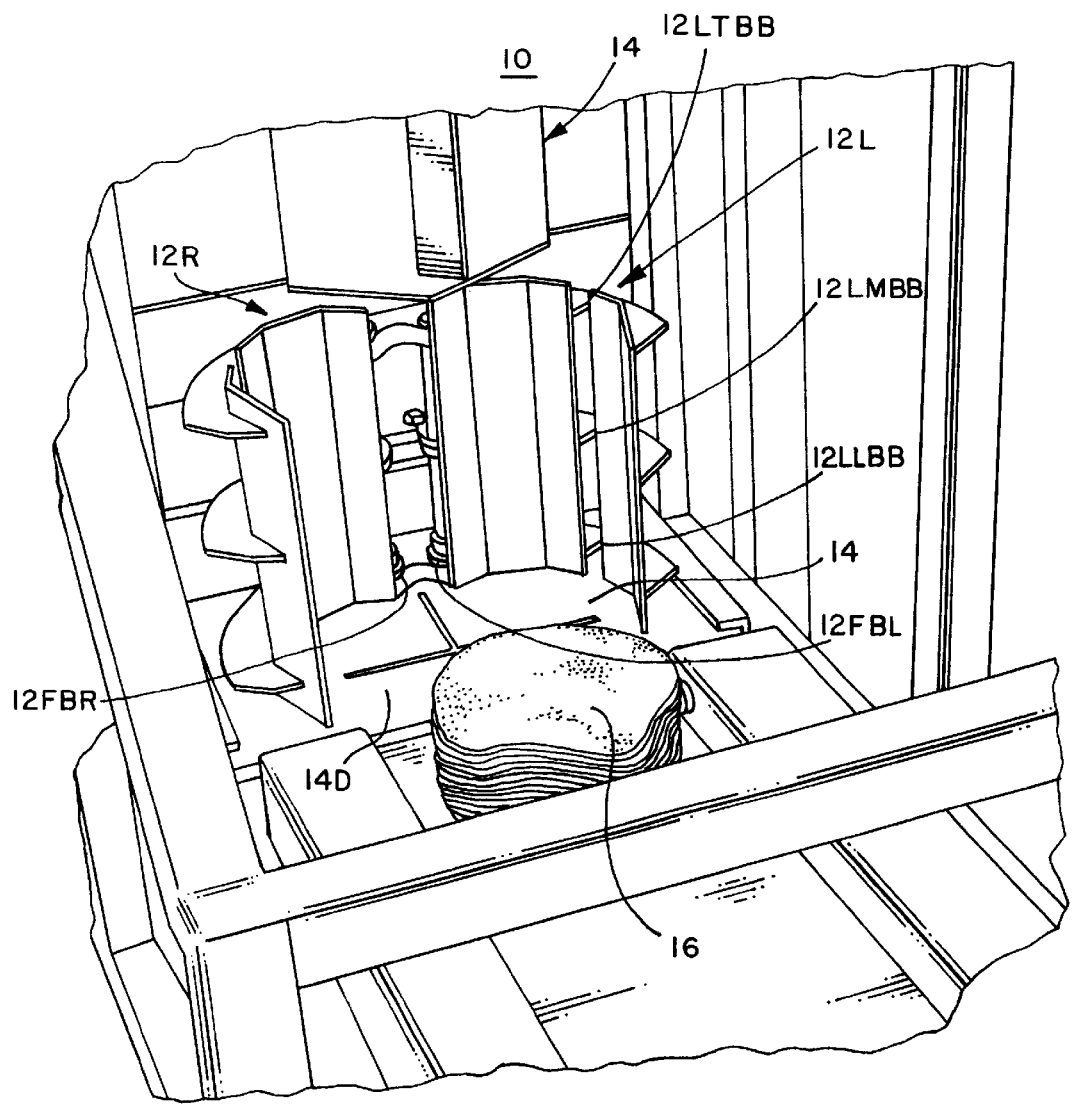
FIGS. 5A–5C are top perspective views of a tortilla cutter (10) in operation.
Figure 5B:
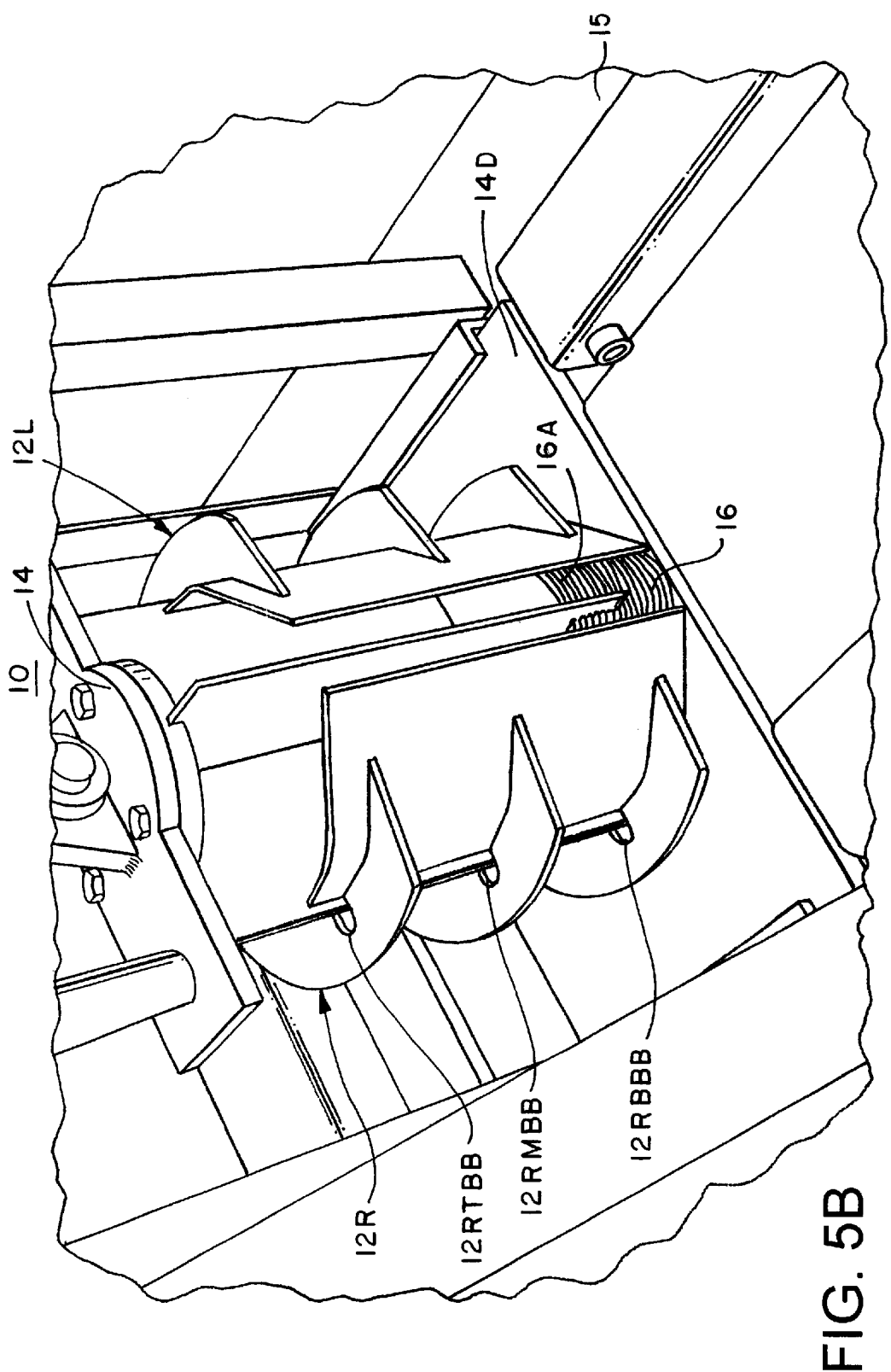
Figure 5C:
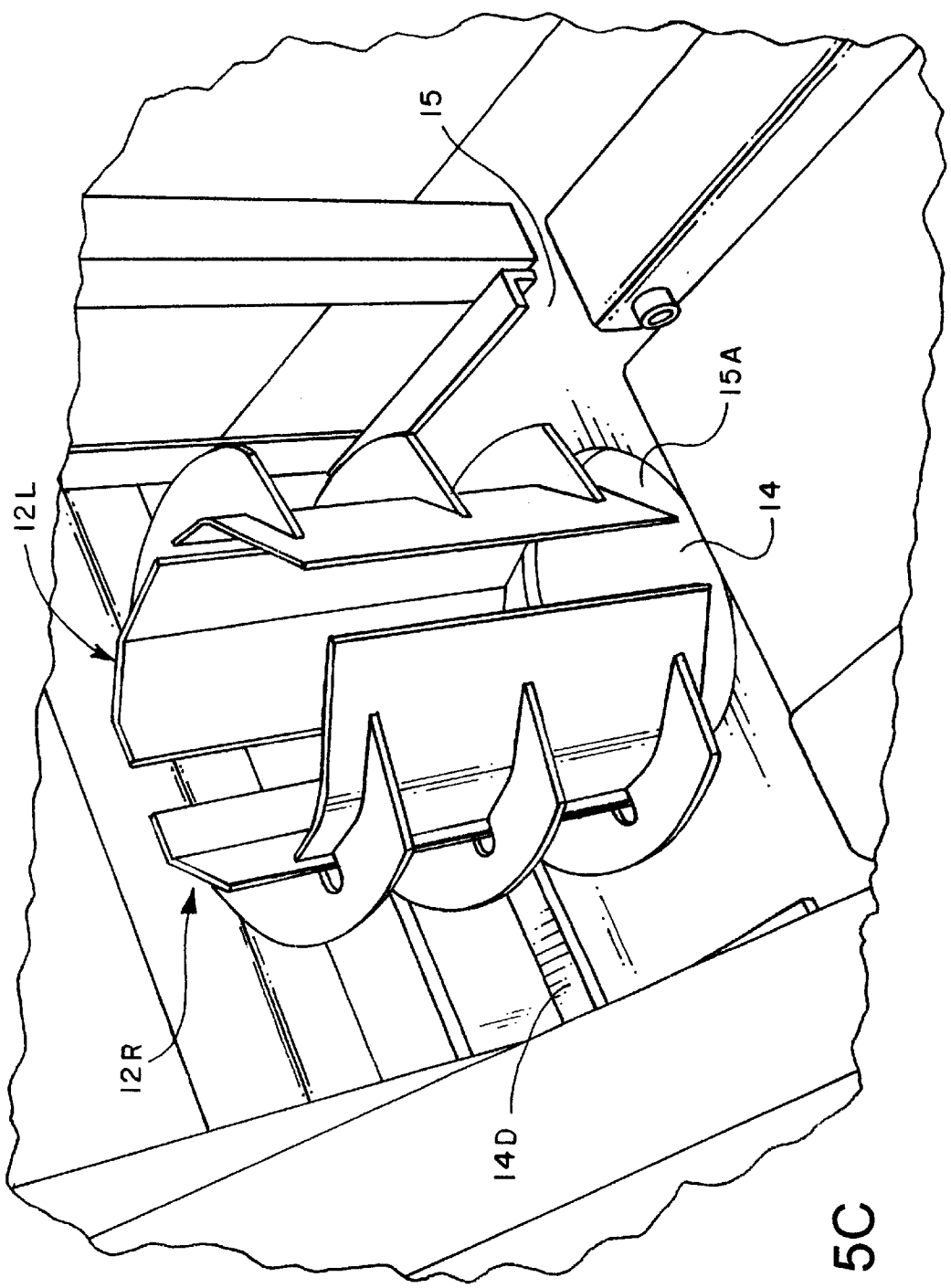

In operation of tortilla cutter (10), the housing shaft (12E) and concurrently the sharp cutter blade is retracted and a stack (16) of at least one tortilla is positioned within the opened housing (12), as shown in FIG. 5A. The housing shaft (12E) is then extended closing the housing (12), and the cutter shaft (14C) is extended forming at least one severed tortilla (16A), as shown in FIG. 5B. The housing shaft (12E) is then retracted, the cutter plate (14D) is retracted exposing base plate opening (15A), and the stack (16) of at least one severed tortilla (16A) falls through base plate opening (15A) into container (18).

It will be understood that each of the elements described above, or two or more together, may also find a useful application in other types of constructions differing from the type described above.

While the invention has been illustrated and described as embodied in a tortilla cutter, it is not intended to be limited to the details shown, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters. Patent is set forth in the appended claims.

What is claimed is:

1. A tortilla cutter (10) comprising:
   A) a housing (12) which comprises a left housing (12L) having a left housing wall (12LA), a right housing (12R) having a right housing wall (12RA), left housing wall (12LA) and right housing wall (12RA) defining an opening in the housing (12), and a housing shaft (12E) connected to left housing (12L) and right housing (12R) which facilitates movement inward and outward to selectively open and close the opening, the movement powered by a device selected from a group consisting of motor, magnetic solenoid, hydraulic piston, and pneumatic piston;
   B) a cutter (14) positioned over the housing (12), the cutter (14) comprising a sharp cutter blade securely affixed to a cutter shaft (14C) powered by a device selected from a group consisting of motor, magnetic solenoid, hydraulic piston, and pneumatic piston, the cutter (14) further comprising a cutter plate (14D) positioned under the housing (12), the cutter plate (14D) comprising a cutter plate opening in a complimentary position to the sharp cutter blade, such that during use of the tortilla cutter (10), the housing shaft (12E) is retracted and a stack (16) of at least one tortilla is positioned within the opened housing (12), the housing shaft (12E) is extended closing the housing (12), the cutter shaft (14C) is extended forming at least one severed tortilla (16A), the housing shaft (12E) is retracted and the at least one severed tortilla (16A) is removed from the opened housing (12).

2. The tortilla cutter (10) as described in claim 1, wherein the sharp cutter blade further comprises a cutter first blade (14A) and a cutter second blade (14B) positioned at perpendicular angles to each other and the cutter plate opening further comprises a cutter plate first opening (14DA) and a cutter plate second opening (14DB) in a complimentary position to the cutter first blade (14A) and the cutter second blade (14B), respectively.

3. The tortilla cutter (10) as described in claim 1, wherein the cutter plate (14D) is movable by a cutter plate shaft (14E) to selectively cover or expose a base plate opening (15A) in a base plate (15), with a container (18) being positioned below base plate opening (15A), such that the cutter plate (14D) is retracted exposing base plate opening (15A), and the stack (16) of at least one severed tortilla (16A) falls through base plate opening (15A) into container (18).

* * * * *